United States Patent [19]

Sitro

[11] Patent Number: 5,765,470

[45] Date of Patent: Jun. 16, 1998

[54] BAKING SUPPORT

[76] Inventor: Robert E. Sitro, 17 Leonard Ave., Haverhill, Mass. 01835

[21] Appl. No.: 779,619

[22] Filed: Jan. 7, 1997

[51] Int. Cl.[6] .................. A47J 43/20; A23P 1/00
[52] U.S. Cl. .................................. 99/432; 99/426
[58] Field of Search .................. 99/426, 432, 428, 99/450.1, 45.6, 353, 449, 422, 450; 425/403, 470, 472; 426/391, 496

[56] References Cited

U.S. PATENT DOCUMENTS

| | | | |
|---|---|---|---|
| 1,946,244 | 2/1934 | Smith | 425/403 |
| 3,540,369 | 11/1970 | Brooks | 99/426 |
| 4,960,211 | 10/1990 | Bailey | 211/60.1 |
| 5,232,609 | 8/1993 | Prevost et al. | 249/102 |
| 5,487,330 | 1/1996 | Mooney | 99/425 |
| 5,601,012 | 2/1997 | Ellner | 99/432 X |

*Primary Examiner*—Reginald L. Alexander
*Attorney, Agent, or Firm*—Morse & Altman

[57] ABSTRACT

A baking support that is a flat sheet of metal bent into a particular 3-dimensional shape and having a body portion and a plurality of leg portions. Optionally, the support includes stippling and/or depressions. Optionally, the support includes neck and head portions, with a bend to prevent the dough from sliding down the support. Optionally, there are a series of removable slats or dowels that extend through holes in the support surface about which the dough is arranged to create knees and elbows. Optionally, a finger extends from the surface for creating holes or openings in the baked product.

9 Claims, 3 Drawing Sheets

1
BAKING SUPPORT

BACKGROUND OF THE INVENTION

1. Field of the Invention

The present invention relates to bread baking supports, more specifically, to devices for supporting bread dough in specific positions so as to create particular shapes while baking.

2. The Prior Art

Ever since dough has been baked into bread and cakes, there has been a means for supporting the dough while it bakes. The earliest form is what is now called the cookie sheet, a flat sheet of metal upon which the dough rests while baking so that only the bottom is supported. As the dough bakes, it spreads outwardly and upwardly, resulting in a baked product that has a flat bottom and an approximately uniformly rounded upper surface. Later came bread and cake pans which, unlike cookie sheets, support the dough on all sides except the top. As the dough bakes, it can only spread upwardly, resulting in a baked product that has bottom and sides molded to the pan, and an approximately uniformly rounded upper surface. Modern technology has been applied to these very old implements in the form of newer, more durable materials and non-stick coatings.

There are occasions when it is desired to make three-dimensional baked objects, such as animal figures. The existing baking supports cannot be easily adapted to do so. For example, the animal body components, such as the legs, torso, head, and tail, are typically baked separately, and then attached together somehow. Because the body components are not formed from one piece of dough, the final product is not very robust and comes apart easily at those points where the components are attached together.

SUMMARY OF THE INVENTION

The principal object of the present invention is to provide an apparatus that supports dough while baking so that a robust three-dimensional baked product is formed.

Another object is to provide an apparatus that will shape legs, arms, and holes into a baked product.

The baking support of the present invention is basically a flat sheet of metal that is bent into a particular 3-dimensional shape. Unlike the bread pans of the prior art, the shape into which the metal sheet is bent supports a portion of the dough only on the dough's bottom, so that the dough is not restricted to expanding only upwardly while baking. And unlike the cookie sheets of the prior art, the bottom of the dough is not flat, but is shaped in three dimensions.

The present invention contemplates that the support has at least a body and a plurality of legs extending downwardly from the body portion, where the support stands on the legs. With these limitations, an essentially infinite variety of shapes are possible, for example, shapes to create various animal figures. Another limitation, however, is that the highest point of the dough cannot be at an end where the support is inclined far enough from the horizontal to cause the dough to slide downwardly, distorting the final shape of the baked product.

The preferred materials for the support depend upon the manner of use of the support. For non-disposable supports, a sturdy, durable material is needed, such as stainless steel. For disposable supports, a lighter, inexpensive material can be used, such as an aluminum alloy. Optionally, the support has a non-stick coating.

Optionally, the support includes stippling and/or depressions to help maintain to position of the dough on the support during baking. Stippling and depressions may also provide a shaped and/or textured bottom surface on the baked product. Optionally, the head portion of a support may include a "duckbill", which provides the same basic function as the depressions and stippling, to prevent the dough from sliding down the neck portion during baking and to provide a more defined head shape. The dough catches in a sharp corner of the duckbill to prevent it from sliding off the head portion.

Optionally, there are a series of projections from the support surface about which the dough is arranged in order to create knees and elbows. Preferably the projections are removable slats or dowels that extend through holes in the support surface. Optionally, the support has a finger extending from the surface for creating holes or openings in the baked product. The finger is either removable or permanent. The outer cross-section of the finger has the shape desired for the opening in the baked product.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
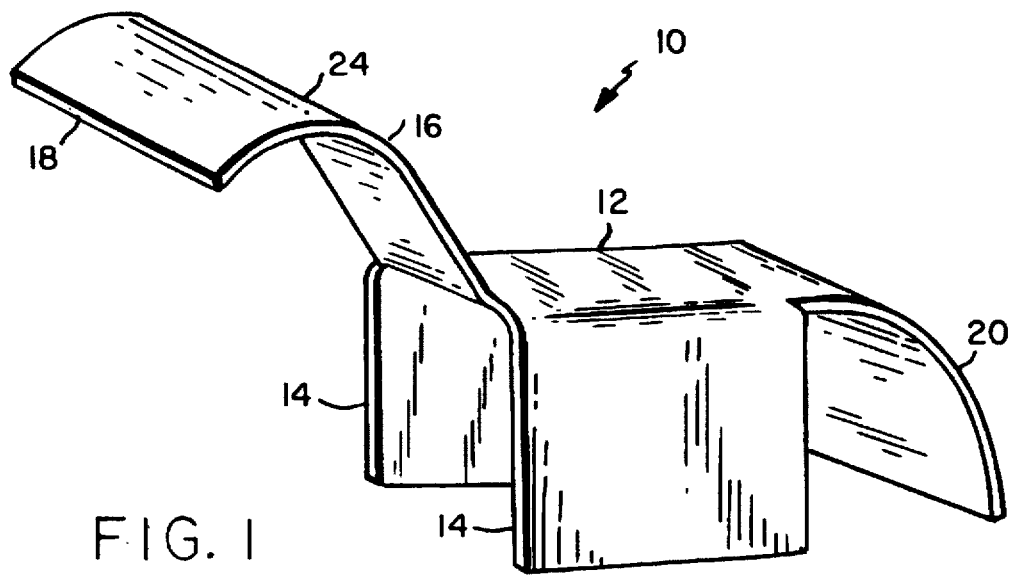
FIG. 1 is a perspective view of a basic embodiment of the present invention.
Figure 2:
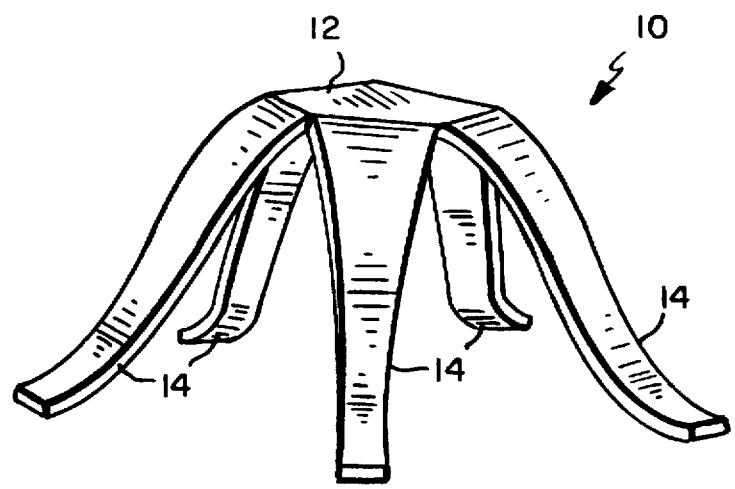
FIG. 2 is a perspective view of another basic embodiment of the present invention.

The baking support 10 of the present invention is basically a flat sheet of metal that is bent into a particular shape, as shown in FIGS. 1 and 2. Unlike the bread pans of the prior art, the shape into which the metal sheet is bent supports a portion of the dough only on the dough's bottom, so that the dough is not restricted to expanding only upwardly while baking. And unlike the cookie sheets of the prior art, the bottom of the dough is not flat, but is shaped in three dimensions.

The present invention contemplates that the support 10 will have a body portion 12 and at least two leg portions 14 extending downwardly from the body portion 12. The support stands on the lower ends of the leg portions 14. Within these parameters, an essentially infinite variety of shapes are possible. Typical of the variety are the shapes of FIGS. 1 and 2, where the support of FIG. 1, which also includes a neck portion 16, a head portion 18, and a tail portion 20, will create a baked product in the shape of a dinosaur, and where the support of FIG. 2 will create a baked product in the shape of a starfish. The support can be shaped so that different portions of the supported side of the dough are inclined at any angle from horizontal to vertical. However, there is one limitation. The highest point of the dough cannot be at an end where the support is inclined far enough from the horizontal to cause the dough to slide downwardly, distorting the final shape of the baked product. Typically, as at 24, the highest point of the support is at an arch, so that at least a portion of the dough on both sides of the arch drapes lower than the arch, as at 56 in FIG. 7, preventing the dough from sliding downwardly. The maximum incline permitted depends upon several characteristics, include the tackiness of the dough, the material of which the support is composed, and the physical characteristics of the support surface, such as the existence of depressions or stippling, as described below.

The preferred materials from which the support 10 is composed include stainless steel, aluminum, and aluminum alloys. The chosen material depends upon the amount and type of use the support 10 will receive, whether or not the support is intended to be disposable and whether or not the shape of the support 10 is intended to be alterable by the user. For non-disposable supports, a sturdy, durable material is needed. The most preferred material for non-disposable supports is AISI Type 304 stainless steel (18% chromium, 8% nickel, 2% manganese, 1% silicon, less than 0.08% carbon), having a thickness of between approximately 10 mils ($^{10}/_{1000}$ inch) and approximately 30 mils. The thickness determines how easily the support is bent. For disposable supports, a lighter, inexpensive material can be used. The most preferred material for disposable supports is an aluminum alloy, having a thickness of between approximately 10 mils and approximately 20 mils.

Figure 3:
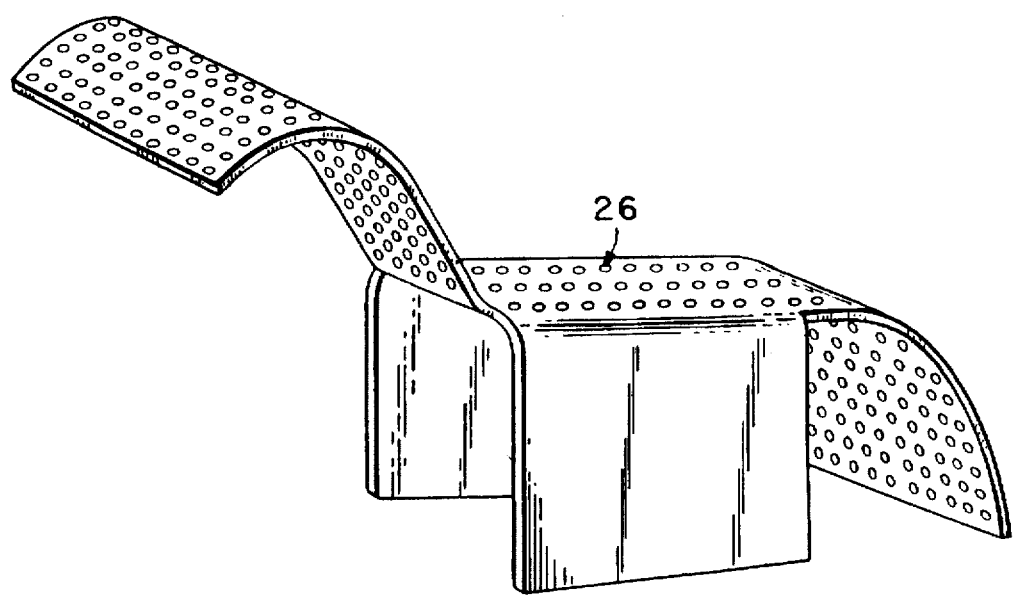
FIG. 3 is a perspective view showing stippling in the support of FIG. 1.

Optionally, the support includes stippling 26, as shown in FIG. 3, which is used when the shape of the support 10 would normally cause difficulty with gravity in maintaining the position of the dough on the support during baking. Typically, the user lightly presses the dough into the stippling 26. Stippling 26 may also be used to provide a textured bottom surface on the baked product.

Figure 4:
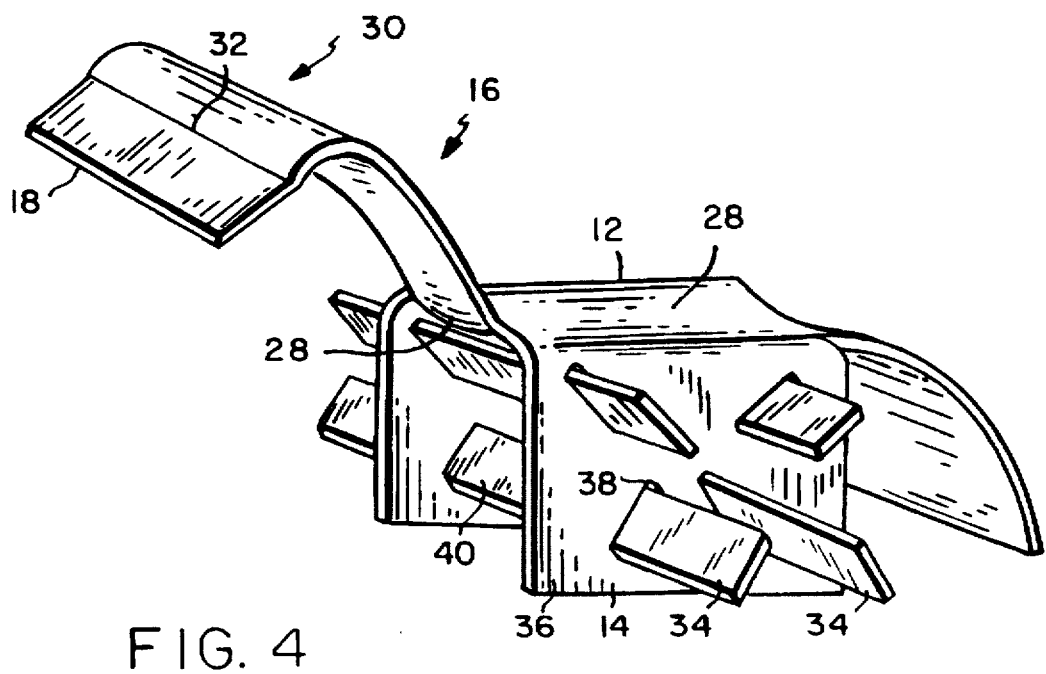
FIG. 4 is a perspective view showing several optional features of the support of FIG. 1.
Figure 5:
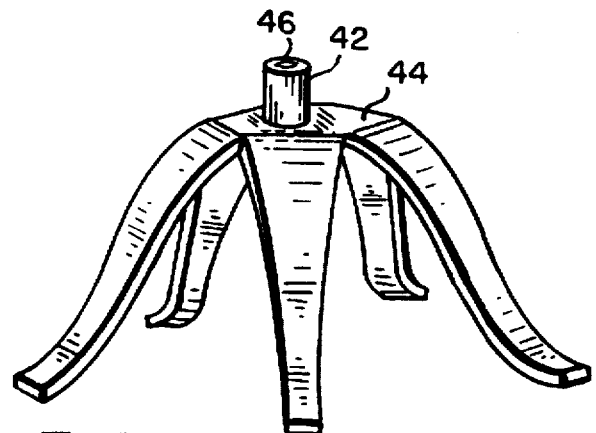
FIG. 5 is a perspective view showing several features of the support of FIG. 2.

Optionally, the support includes depressions 28, as shown in FIG. 4, which are used, as with the stippling, when the shape of the support 10 would normally cause difficulty in maintaining the position of the dough on the support during baking. Depending upon the location of the depressions 28, either gravity will push the dough into the depressions 28, or the user lightly presses the dough into the depressions 28. Depressions 28 may also be used when a rounded bottom is desired in the baked product, such when simulating the belly of an animal figure.

Another option is the "duckbill" 30, as shown in FIG. 4. The duckbill 30 is used on a raised portion of the support, typically the head portion 18, and provides the same function as the depressions and stippling, to prevent the dough from sliding down the neck portion 16 from the desired position on the head portion 18 during baking. The dough is draped over the duckbill 30, as in FIG. 7, and catches in a sharp corner 32 to prevent the weight of the dough from causing it to slide off the head portion 18. The duckbill 30 also provides more definition to the shape of the head of the baked product, making it more distinguishable from the neck.

Sometimes it is desired that the baked product have bends in vertical components, for example, a knee in a leg or an elbow in an arm. The preferred apparatus for accomplishing this is shown in FIG. 4 as a series of posts 34 projecting from the main surface 36 about which the dough is arranged. The posts 34 must be sized so that, when baking, the dough does not expand to surround the posts 34. If this should occur, the baked product will be more difficult to remove from the support 10 and be more easily damaged in the process.

Preferably the posts 34 are removable, as in FIG. 4. There are slotted openings 38 within the main surface 26 through which extend slats 40. The slats 40 can be any material that the dough will not adhere to and that can withstand the temperatures used during baking. A typical example is wood, as in a wooden tongue depressor. Alternatively, the openings are round through which round dowels extend. If the dough should expand around the removable slats or dowels while baking, the slats or dowels can be slowly pulled from the baked product before attempting to remove the baked product from the support, minimizing the risk of damage to the baked product.

It is occasionally desired to have an opening in the baked product for functional or aesthetic reasons. The problem is that as the dough bakes and expands, any opening will become substantially smaller or even close up completely. The solution provided by the present invention is another form of projection similar to the posts: a finger 42 that extends from the support surface 44. The finger 42 is either removable or not removable. There are many ways known in the art to make the finger 42 removable, any and all of which are contemplated here. The outer cross-section of the finger 42 has the shape desired for the opening, such as round or star-shaped. As the dough bakes, it is prevented from expanding into the opening by the finger 42. The baked product is removed by sliding it off the finger 42 away from the main support. If the finger 42 is not removable, it cannot be larger at its outer end 46 than at the support surface 44, otherwise the baked product cannot be removed. Also, if there is more than one non-removable finger 42, they must be parallel, otherwise the baked product cannot be removed.

Optionally, the support surface has a non-stick coating. Because a non-stick coating will render the support surface slippery, a non-stick coating is only advantageous if the dough can be draped on the support 10 so that the weight of the dough is balanced enough that it does not slide off the support during baking.

OPERATION

Figure 6:
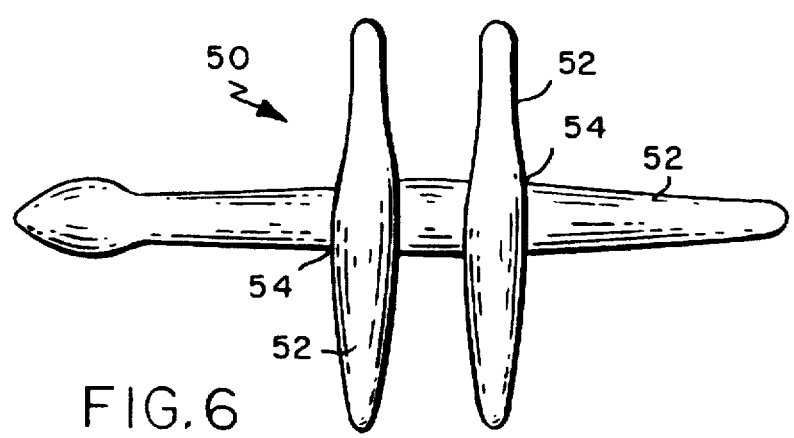
FIG. 6 is a top view of a typical formation of dough using one method.

The dough is formed into the shape necessary to fit on the support 10. Two methods for forming the dough suggest themselves. In the first method, the dough 50 is rolled into thin rope-like shapes 52 and then combined into the appropriate shape, as in FIG. 6. The rope shapes are tacked together, as at 54, such as by pressing them together until they stick to each other. In the second method, the dough is rolled out into a flat sheet and an appropriately shaped cookie cutter is used to cut the dough into the shape for the support 10.

Figure 7:
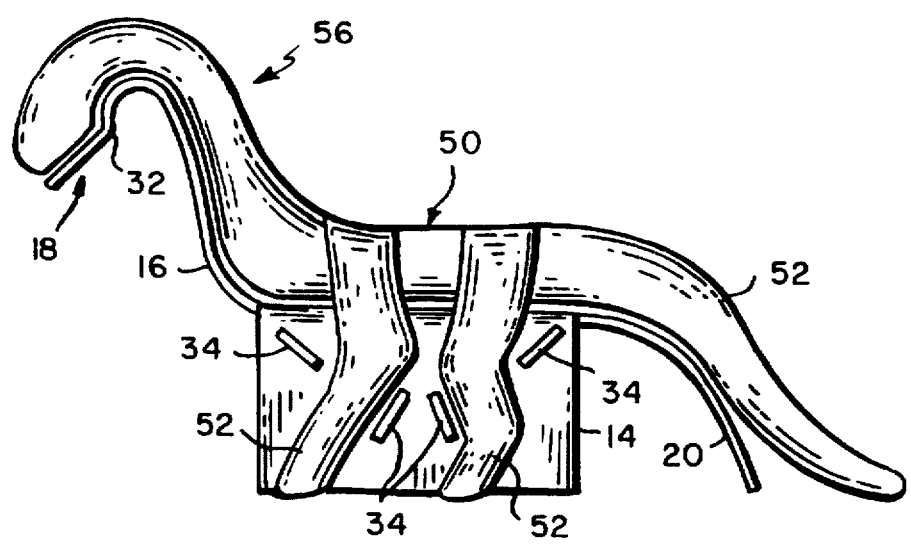
FIG. 7 is a side view showing how dough is draped on the support of FIG. 1.

After the dough is formed, it is draped over the support 10, as in FIG. 7, lightly pressing it as necessary into any formations, such as depressions, stippling, and duckbill 18, routing it around projections 26. Where a finger is used, the dough may be cut out at the finger or it may be wrapped around the finger and tacked together.

After the dough is draped onto the support 10, the combination is placed in an oven and baked at the appropriate temperature. After baking, the baked product is removed from the support 10 as described above and used as desired.

Thus it has been shown and described a baking support which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A baking support for supporting dough during baking, said support comprising:

(a) a body portion having an outer body surface;

(b) a plurality of leg portions extending downwardly from said body portion, each of said leg portions having an outer leg surface and a remote end;

(c) said outer body surface and said outer leg surfaces combining to form an outer surface; and (d) said baking support standing on said a plurality of said leg remote ends;

(e) whereby said dough is draped on said outer surface prior to baking.

2. The baking support of claim 1 wherein said outer surface includes stippling.

3. The baking support of claim 1 wherein said outer surface includes at least one depression.

4. The baking support of claim 1 wherein a neck portion extends upwardly from said body portion, said neck portion having a head portion remote from said body portion.

5. The baking support of claim 4 wherein said neck portion curves downwardly to a sharp corner, said head portion extending away from said body portion at said corner.

6. The baking support of claim 1 wherein said outer surface includes at least one projection around which said dough is arranged.

7. The baking support of claim 6 wherein said at least one projection is removable.

8. The baking support of claim 6 wherein at least two of said legs are approximately parallel and include at least a pair of aligned openings through which a removable slat is positioned, said slat extending outwardly from said outer leg surfaces of said at least two of said legs to form two of said projections.

9. The baking support of claim 1 wherein said outer surface has a non-stick coating.

* * * * *